(12) United States Patent
Kho et al.

(10) Patent No.: US 7,962,092 B2
(45) Date of Patent: Jun. 14, 2011

(54) SMALL-SIZED RADIO FREQUENCY TYPE REPEATER

(75) Inventors: Jae-Chang Kho, Seoul (KR); Jun-Pyo Hong, Seoul (KR)

(73) Assignee: LG Uplus Corp., Seoul (KR)

( * ) Notice: Subject to any disclaimer, the term of this patent is extended or adjusted under 35 U.S.C. 154(b) by 832 days.

(21) Appl. No.: 11/982,318

(22) Filed: Nov. 1, 2007

(65) Prior Publication Data

US 2008/0132165 A1 Jun. 5, 2008

(30) Foreign Application Priority Data

Nov. 2, 2006 (KR) .......................... 10-2006-0107722
Mar. 12, 2007 (KR) .......................... 10-2007-0023950

(51) Int. Cl.
*H04B 7/15* (2006.01)

(52) U.S. Cl. ....... 455/11.1; 455/7; 455/67.16; 455/90.3; 370/315; 370/316

(58) Field of Classification Search ................. 455/11.1, 455/15, 7, 17, 101, 22, 12.1, 67.16, 90.3, 455/562.1, 571, 575.1, 575.5; 370/210, 315, 370/316; 375/148, 150

See application file for complete search history.

(56) References Cited

U.S. PATENT DOCUMENTS

| | | | |
|---|---|---|---|
| 2004/0110469 A1* | 6/2004 | Judd et al. ....................... | 455/15 |
| 2004/0166802 A1* | 8/2004 | McKay et al. .................. | 455/15 |
| 2006/0014491 A1* | 1/2006 | Cleveland ....................... | 455/17 |
| 2006/0052066 A1* | 3/2006 | Cleveland et al. ............. | 455/101 |
| 2006/0063487 A1* | 3/2006 | Cleveland et al. ............. | 455/22 |
| 2006/0205343 A1* | 9/2006 | Runyon et al. ............... | 455/11.1 |
| 2008/0081555 A1* | 4/2008 | Kong et al. ................... | 455/11.1 |
| 2009/0323582 A1* | 12/2009 | Proctor et al. ................ | 370/315 |
| 2010/0029197 A1* | 2/2010 | Judd et al. .................... | 455/11.1 |

* cited by examiner

*Primary Examiner* — Tan Trinh
(74) *Attorney, Agent, or Firm* — Nelson Mullins Riley & Scarborough LLP; EuiHoon Lee, Esq.

(57) ABSTRACT

A small-sized Integrated Radio Frequency Type Repeater includes first and second Service (transmitting) Antennas, a Junction circuit part with RF type (200) which plays the role of relay, a Shield Box (400) which protects the first and second Service Donor (receiving) Antennas (310, 320) and a Junction circuit part (200) installed inside of the same body. (Cover) (500). The first Service (transmitting) Antenna (110) and the first Donor (receiving) Antenna (310) attached to opposite sides of the Shield Box (400) and the second Service Antenna (120) is separated from the first Service (transmitting) Antenna (110) between the inside of Cover (500) and the first Service (transmitting) Antenna (110), and the second Donor (receiving) Antenna (320) is installed to be separated from the first Donor (receiving) Antenna (310) between the inside of the Cover (500) and the first Donor (receiving) Antenna (310). The Repeater makes good output waveform to transmit even in a state of low isolation margin including minimization of Oscillation volume due to delay reduction of Repeater by application of RF type which possible to use of Filter with low delay, not IF type which used SAW Filter or Digital Filter with a relatively high delay, and it takes effect to expand so much service scope by improvement of output gain with this.

16 Claims, 7 Drawing Sheets

(a) system delay = 4µs (b) system delay = 0.7µs (c) System delay = 0.3µs

| # of example | Power | Filter | Delay (μs) | Whether quality value of output waveform is qualified or not in accordance with Isolation Margin (quality value of output waveform) | | | | | | | | # of peak /10MHz |
|---|---|---|---|---|---|---|---|---|---|---|---|---|
| | | | | 0dB | 2dB | 4dB | 6dB | 8dB | 10dB | 12dB | 15dB | |
| Example 1 | 30W | SAW Filter | 3.8 | × | × | × | × | × | ×(0.84) | ×(0.91) | O(0.99) | 35 |
| Example 2 | 20mW | SAW Filter | 2 | × | × | × | × | ×(0.84) | ×(0.9) | O(0.94) | O(0.99) | 18 |
| Example 3 | 30mW | DR Filter | 0.7 | × | × | × | ×(0.82) | O(0.92) | O(0.96) | O(0.98) | O(0.99) | 5 |
| Example 4 | 20mW | DR Filter | 0.25 | × | ×(0.82) | ×(0.9) | O(0.95) | O(0.97) | O(0.98) | O(0.99) | O(0.99) | 2 |
| Example 5 | 20mW | DR Filter | 0.1 | × | ×(0.9) | O(0.95) | O(0.95) | O(0.97) | O(0.98) | ×(0.99) | O(0.99) | 1 |

Cover(500)    Shield Box(400)

[delay : 2 μs , maximum gain : 50dB]

(a)

[delay : 0.7 μs , maximum gain : 55dB]

SMALL-SIZED RADIO FREQUENCY TYPE REPEATER

CROSS-REFERENCE TO RELATED APPLICATIONS

This application claims the benefit of Republic of Korea Application No. 10-2006-0107722, filed Nov. 2, 2006 and Republic of Korea Application No. 10-2007-0023950, filed Mar. 12, 2006, which are incorporated herein by reference.

BACKGROUND OF THE INVENTION

1. Field of the Invention

The present invention relates to Small-sized Integrated RF Type Repeater, in more details, it related to Small-sized Integrated RF Type Repeater that makes good output waveform transmit even in a state of low isolation margin to be realized minimization of Oscillation volume due to delay reduction of Repeater by application of RF type which possible to use of Filter with low delay, not IF type which used SAW Filter or Digital Filter with a relatively high delay, and it takes effect to expand so much service scope by improvement of output gain with this in the embodiment of Small-sized Integrated Repeater.

2. Description of the Related Art

Figure 1:
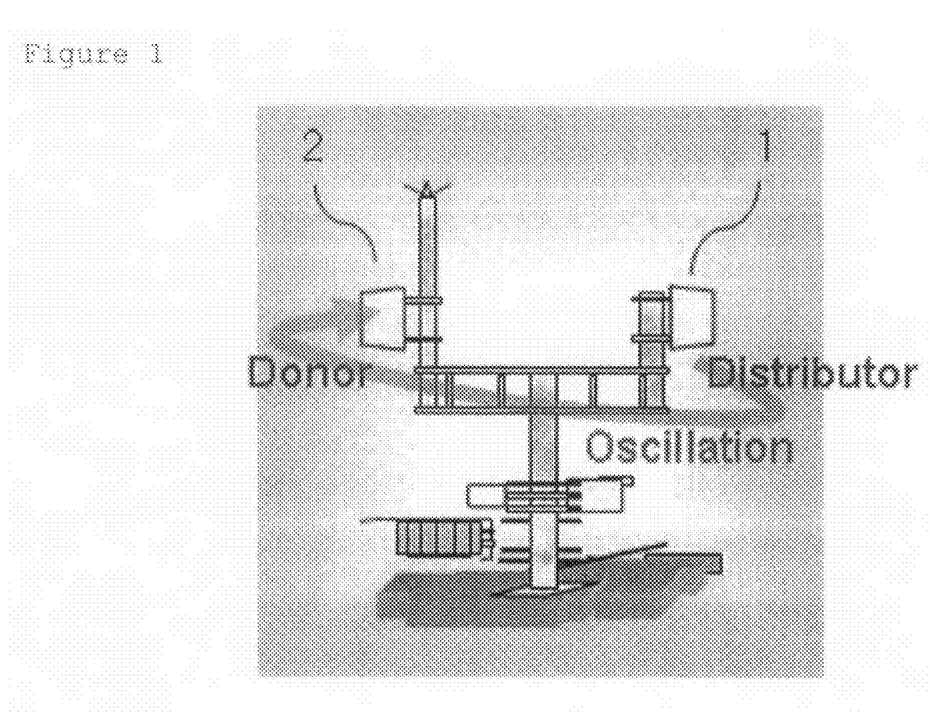
FIG. 1 is a drawing to describe Oscillation phenomenon of common Repeater.

As is generally known, Oscillation of Repeater means phenomenon which organized signal from the Distributor Antenna to the Donor Antenna (2) again as illustrated in FIG. 1. But then, in this case, when organized volume is increased, the service of Repeater can not be performed due to the occurrence of Oscillation It is important to secure the isolation in order to prevent Oscillation phenomenon of Repeater, and it differs according to the structure of Repeater. Specially, distance between Distributor Antenna and Donor Antenna of the Repeater is main element, and the closer distance, the more difficult to secure the isolation, and difficult to obtain the desired gain.

Recently, the Repeater has been made smaller so as to install it in the building or home easily, Smaller-sized Integrated Repeater which made in integrated type is featuring. In case of Small-sized Integrated Repeater, Distributor Antenna and Donor Antenna is located in the same body structurally and close to an absolute location, so it has a problem that difficult to reduce the Oscillation volume than conventional distributed Repeater. Therefore, in case of conventional Small-sized Integrated Repeater, the technology on security of the isolation, and addition of reflection plate by structure change in order to prevent Oscillation, or prevention of Oscillation with addition of Feedback circuit in the internal junction circuit in order to prevent Oscillation tend to be developed.

Figure 2:
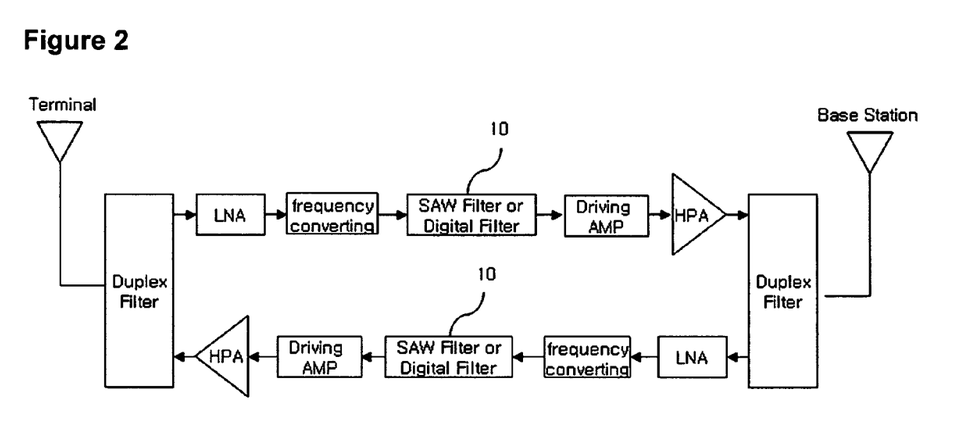
FIG. 2 is a function block diagram which indicated internal configuration of Small-sized Integrated IF Type Repeater which made use of conventional SAW Filter or Digital Filter.

On the other hand, the above stated conventional Small-sized Integrated Repeater makes use of IF Type Repeater as FIG. 2, and IF Type means that the method which makes restore and amplify it to the original frequency by Filtering after converting received signal to the Intermediate Frequency. In this case, Filter in the internal circuit of conventional Repeater takes only interest in Filtering function which appropriate to remove the other signal, or in case of foreign countries, SAW Filter (10) or Digital Filter (10) is used for IF Filtering so as to choose the frequency band.

However, in case of Small-sized Integrated Repeater, Distributor Antenna and Donor Antenna are attached to the Junction circuit part in Patch Antenna Type and integrated Type, and so SAW Filter or Digital Filter which excels in capability of the interference removal but with high delay element is not entirely necessary to use intentionally because it is not an object of wireless test although it has less interference removal between another company. Nevertheless, all conventional Small-sized Integrated Repeaters are embodied with IF Type which made use of SAW Filter or Digital Filter, and so the Oscillation volume cannot help increasing due to the delay increase, and they had a problem which cannot help decreasing output gain by the increase of isolation margin with this.

Therefore, as the present invention is achieved to solve conventional problem as, the purpose of the present invention is to be transmitted good output waveform even in a state of low isolation margin to be realized minimization of Oscillation volume due to delay reduction of Repeater by application of RF type which possible to use of Filter with low delay, not IF type which used SAW Filter or Digital Filter with a relatively high delay, and to provide Small-sized Integrated RF Type Repeater to expand so much service scope by improvement of output gain with this.

Another purpose of the present invention is to provide Small-sized Integrated RF Type Repeater which convenient for installation and maintenance because the Service (transmitting) Antenna, the Donor (receiving) Antenna and the Shield Box are installed inside the Cover, and also has improved output gain and good radiation pattern, and miniaturization is possible.

SUMMARY OF THE INVENTION

In order to achieve the purpose as, in Small-sized Integrated Repeater, Small-sized Integrated RF Type Repeater of the present invention is characterized, that the first and second Service (transmitting) Antenna which plays the role of signal transmission, Junction circuit part which plays the role of relay, the first and second Donor (receiving) Antenna which plays the role of signal reception and the Shield Box which protects and also plays the role of earth of the Junction circuit part are installed inside of the same body (Cover); but the first Service (transmitting) Antenna and the first Donor (receiving) Antenna are formed to be attached to the opposite side of the Shield Box respectively, and the second Service Antenna is installed to be separated from the first Service (transmitting) Antenna between the inside of the Cover and the first Service (transmitting) Antenna, and the second Donor (receiving) Antenna is that installed to be separated from the first Donor (receiving) Antenna between the inside of the Cover and the first Donor (receiving) Antenna.

Also, in Small-sized Integrated Repeater which Service (transmitting) Antenna and Donor (receiving) Antenna are in the same body, Small-sized Integrated RF Type Repeater of the present invention characterized which comprises the first Duplex Filter which makes transmitting/receiving RF signal path separate;

RF transmitting part which makes it output with performing of high power amplification after Filtering when RF signal which transmitted from Base Station is received via the first Duplex Filter;

the second Duplex Filter which makes it output to be separated transmitting/receiving RF signal path, but received RF signal from the RF transmitting part and then transmit it to the Terminal, and also transmit it to the receiving part when RF signal is received from the Terminal; and RF receiving part which makes it output to the first Duplex Filter with performing of high power amplification after Filtering when RF signal which transmitted from Base Station is received via the second Duplex Filter.

DESIGNATION NUMBERS OF DRAWINGS

110: First Service (transmitting) Antenna
111: Board
112: Emitting Element
113: Feeder
120: Second Service (transmitting) Antenna
121: Board
122: Parasitic Element
200: Junction circuit part
210: First Duplex Filter
220: RF transmitting part
221: First Low Noise Amplifier
222: First Band Pass Filter
223: First Driving Amplifier
224: First High Power Amplifier
230: First Duplex Filter
240: RF receiving part
241: Second Low Noise Amplifier
242: Second Band Pass Filter
243: Second Driving Amplifier
244: Second High Power Amplifier
310: First Donor (receiving) Antenna
311: Board
312: Emitting Element
313: Feeder
320: Second Donor (receiving) Antenna
321: Board
322: Parasitic Element
400: Shield Box
500: Cover

DETAILED DESCRIPTION OF THE INVENTION

Hereinafter, it is described in detail regarding Small-sized Integrated RF Type Repeater in accordance with a practical example of the present invention with reference to the attached drawings, but it is described on the assumption that flow which from Base Station to Terminal is transmitting flow, and from Terminal to Base Station is receiving flow.

The present invention is developed with looking in that numerical value which related to the delay of the internal circuit is concerned with the isolation margin for prevention of the Oscillation.

Figure 3:
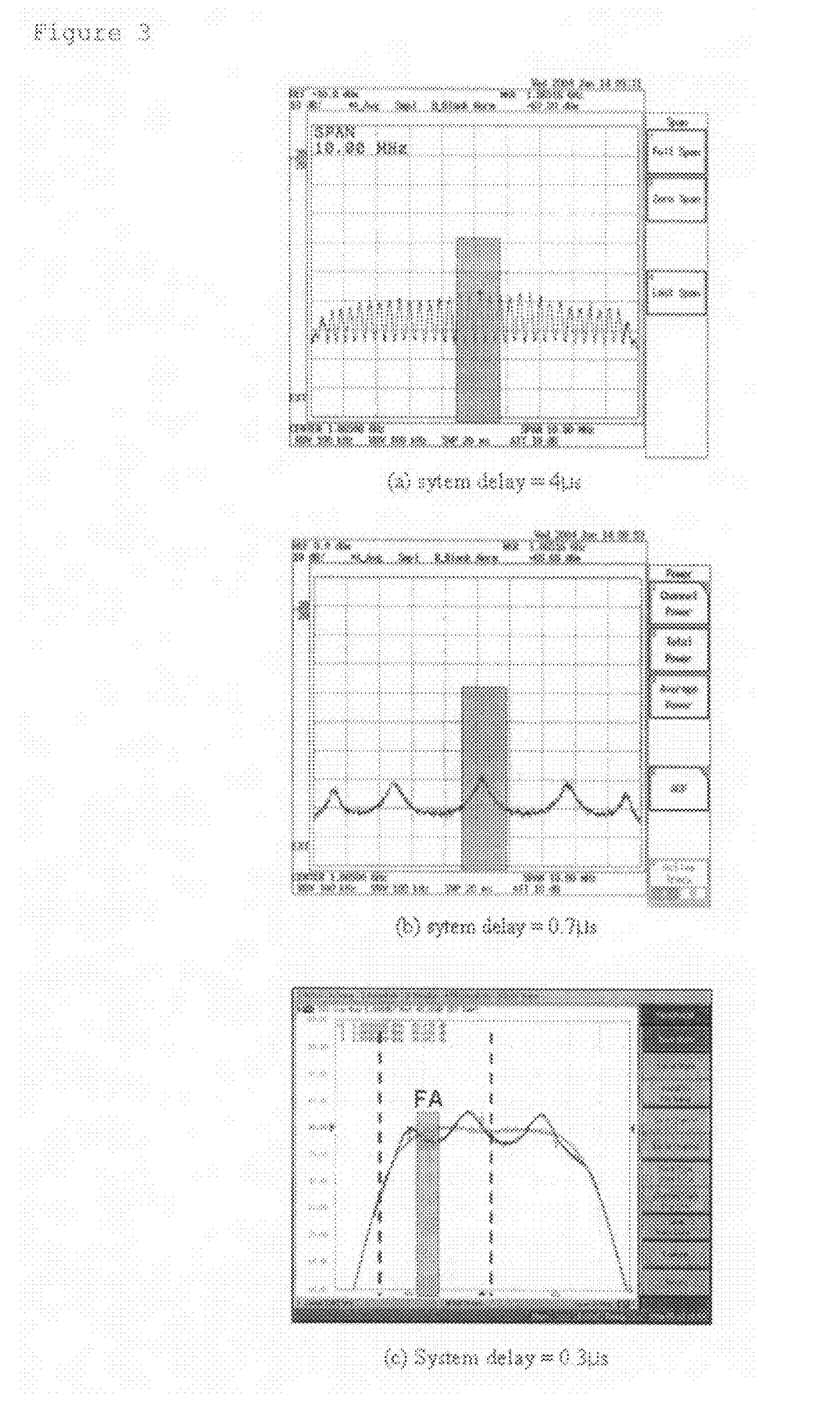
FIG. 3 is a drawing to show comparing with Oscillation volume in accordance with difference of system delay of Repeater.

As the present invention is looked in that Oscillation is related to the delay of Repeater System, Oscillation volume is increased by the volume which organized to the Donor Antenna is increased when the delay time become longer as FIG. 3 (a), and Oscillation volume is decreased by the volume which organized to the Donor Antenna is decreased when the delay time become shorter as FIG. 3 (c).

Figure 4:
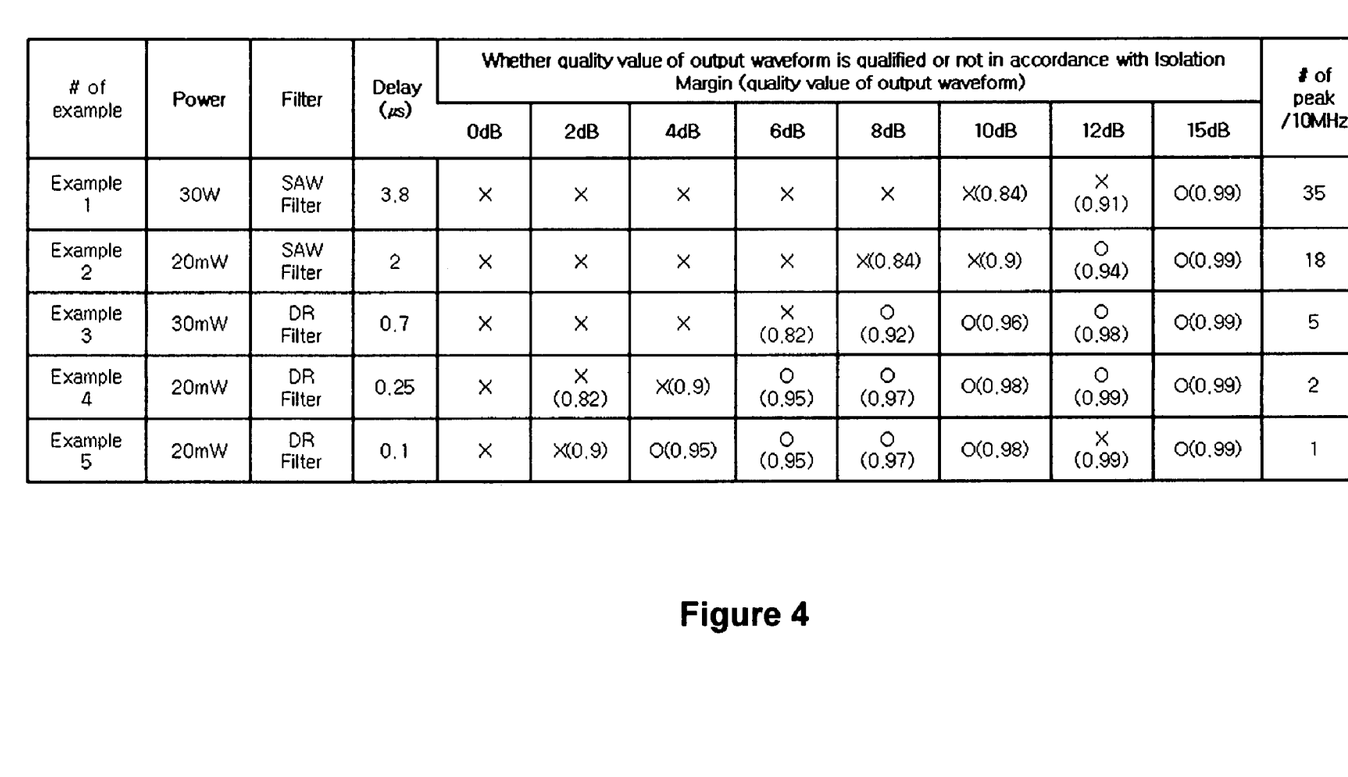
FIG. 4 is a drawing to show table which indicated isolation margin between Antennas to the gain of Repeater and value of output waveform quality in accordance with system delay of Repeater.

FIG. 4 is indicated isolation margin between Antennas to the gain of Repeater and the quality value of output waveform in accordance with system delay of Repeater. Typically, the quality value of more than 0.192 is stipulated in standard which possible to service in CDMA, and FIG. 4 is indicated test result of whether the isolation margin and the quality value of output waveform in accordance with system delay of Repeater is passed standard or not.

Generally, a condition which is not occurred Oscillation means the case which the isolation margins is secured more than 15 dB. When the isolation between antennas of Repeater with system delay of 3.8 μs is 75 dB, the system gain of Repeater can be set in 60 dB (75 dB−15 dB (Isolation Margin)), when the gain is set more than 60 dB (in case that Isolation Margin is less than 15 dB), the call is not possible because the quality value of waveform becomes lower due to the Oscillation as "experimental example 1" of FIG. 4. Namely, the quality value of waveform becomes lower means that peak number of waveform due to the Oscillation within the band is increased.

On the other hand, as indicated in FIG. 4, when the system delay of Repeater is decreased, peak number of waveform due to the Oscillation within the band is decreased, so it tends to be possible to make a call because the value of isolation margin in general known is low but the quality value of waveform becomes better.

In this case, the method to reduce the system delay depends on what kind of Filter used in nature of Repeater. However, as-stated previously, such SAW Filter (10) or Digital Filter (10) used in conventional IF Type Repeater as FIG. 2 is generated the delay of about 2-4 μs. However, in case of Small-sized Integrated Repeater which are embedded the Service (transmitting) Antenna (110, 120) and the Donor (receiving) Antenna (310, 320) are attached to the Junction circuit part in the shape of the Patch Antenna, and the Service (transmitting) Antenna (110, 120) and Junction circuit part (200), and the Donor (receiving) Antenna (310, 320) in the same body (Shield Box) (400) as FIG. 5, SAW Filter which excels in capability of the interference removal but with high delay element is not entirely necessary to use intentionally because it is not an object of wireless test even if it has less interference removal between another company.

Figure 5A:
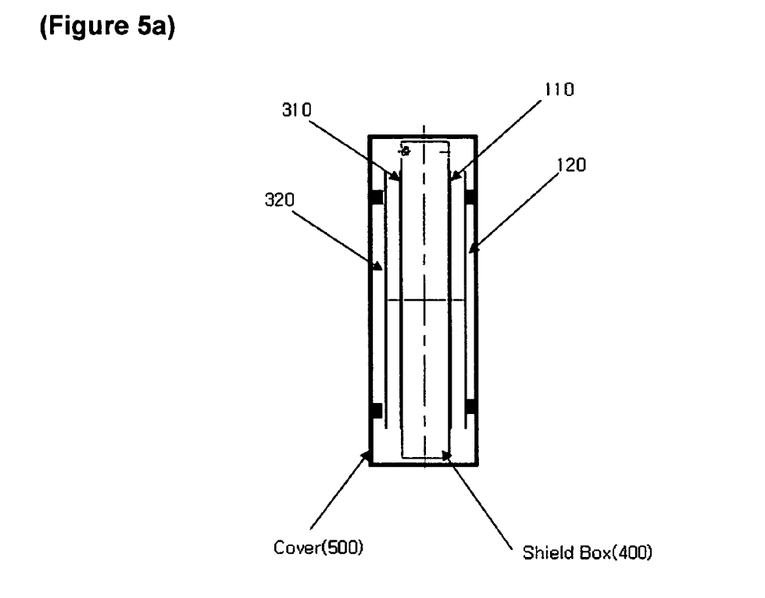
FIG. 5 is a drawing to show structure of Small-sized Integrated RF Type Repeater in accordance with a Practical Example of the present invention.
Figure 5B:
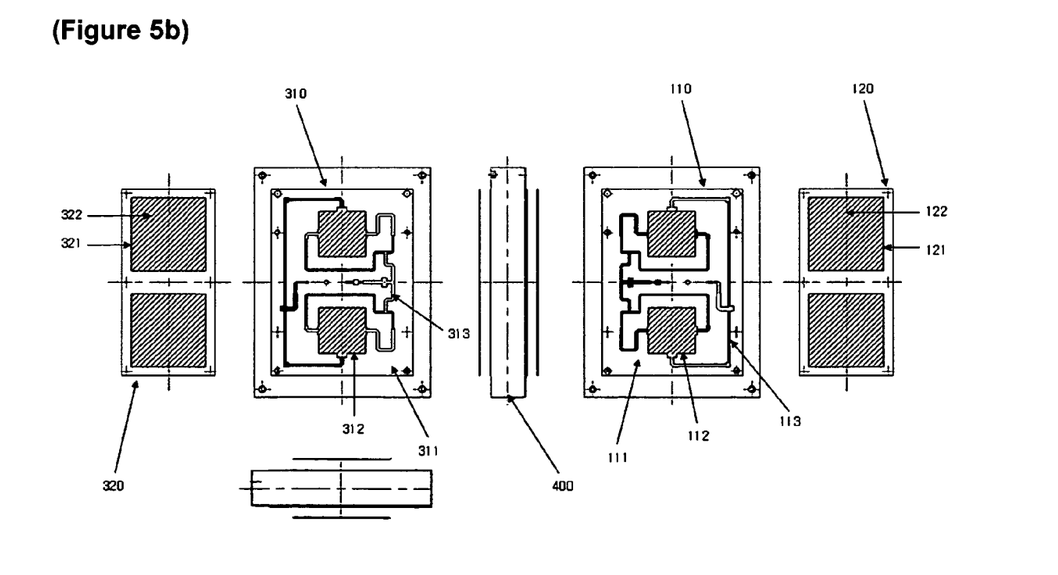

Small-sized Integrated RF Type Repeater in accordance with a practical example of the present invention comprises with structure which the first and second Service (transmitting) Antenna (110, 120), Junction circuit part (200), the first and second Service Donor (receiving) Antenna (310, 320) and the Shield Box (400) are installed in the inside of the cover (500).

The first Service (transmitting) Antenna (110) and the first Donor (receiving) Antenna (310) have the Board (111, 311), and Emitting Element (112, 312) which formed in the one side of the Board (111, 311) and the Feeder respectively. In this case, each of the Emitting Element (112, 312) can be the Patch Type which formed with the Etching Method in the Board (111, 311).

Also, when the first Service (transmitting) Antenna (110) and the first Donor (receiving) Antenna (310) is installed to be separated from the Shield Box (400), they are formed which is attached to the opposite side of the Shield Box respectively because they cab be occurred resonance.

On the other hand, the second Service Antenna (120) and second Donor Antenna (320) have the Board (121, 321) and a Parasitic Element (122, 322) which formed in the one side of the Board (121, 321) respectively. In this case, each of the Parasitic Element (122, 322) can be the Patch Type which formed with the Etching Method in the Board (121, 321).

Also, each of the Parasitic Element (122, 322) locates to be faced with the Parasitic Element (112, 312) which formed in the first Service (Transmitting) Antenna (110) and the first Donor (receiving) Antenna (310).

On the other hand, the second Service Antenna (120) and second Donor Antenna (320) has an effect on VSWR of Small-sized integrated Repeater, and make so as to have good emitting pattern.

Also, the Shield Box (400) protects internal Junction circuit part (200), and plays the role of the surface of the earth with connection to the Emitting Element (112, 312) and the Feeder (113, 313) which formed in the first Service (transmitting) Antenna (110) and the first Donor (receiving) Antenna (310), and can increase the output gain with improved isolation feature of Small-sized Integrated Repeater by prevention of the Organic Phenomenon of signal between Service (transmitting) Antenna (110) and first Donor (receiving) Antenna (310) with the wider surface than the Emitting Element (112, 312) which formed in the first Service (transmitting) Antenna (110) and the first Donor (receiving) Antenna (310).

On the other hand, the Cover (500) is composed of the acryl material which is similar in permittivity to air so as to be passed transmitted/received signal well, and can be formed in various type considering beauties, and makes to be protected from the outside.

Desirably, Small-sized Integrated Repeater is installed to be separated from the first Service (transmitting) Antenna (110) between the inside of Cover (500) and the first Service (transmitting) Antenna (110), and the second Donor Antenna (320) is installed to be separated from the first Donor (receiving) Antenna (310) between the inside of the Cover (500) and the first Donor (receiving) Antenna (310).

Hereinafter, it is described the test result of Small-sized Integrated Repeater which configured as FIG. 5 classifying into the [Comparative Example] and [Practical Example] referring to FIG. 6.

COMPARATIVE EXAMPLE

Figure 6:
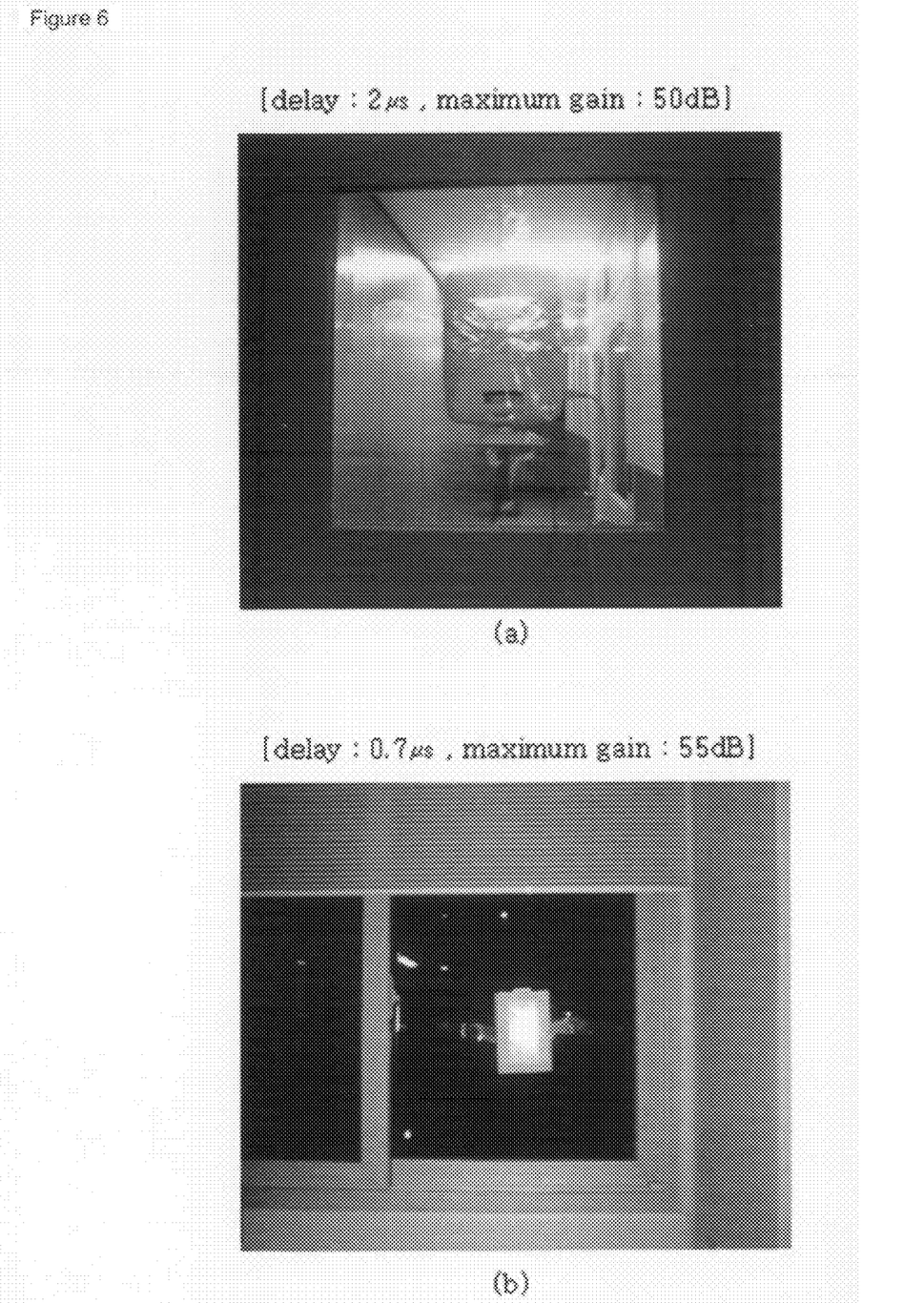
FIG. 6 is practical drawing to show gain increase in accordance with delay of Small-sized Integrated RF Type Repeater followed by FIG. 5.

FIG. 6 (a) is indicated that the case which embodied with 200*250*60 (W*H*D)mm in dimension of the Shield Box, and used SAW Filter (2 μs delay) in the shape of conventional Small-sized Integrated Repeater. In this case, maximum potential isolation between antennas on site is about 65-70 dB, and maximum gain is about 50 dB.

PRACTICAL EXAMPLE

When the Shield Box of Small-sized Integrated Repeater makes 160*200*60 (W*H*D)mm in dimension as FIG. 6 (b), and installed to be embodied in low delay form, and DR Filter (0.7 μs delay), it can obtain the maximum gain with more than 55 dB than the case that makes use of the Filter with smaller size and also long delay.

The test result also can be described with Table in FIG. 4. In about 65-70 dB of Isolation in case of the [Comparative Example], when isolation margin is to be 15 dB (namely, isolation: 65 dB, gain: 50 dB) in 2 μs of system delay in Repeater as "Experimental Example 2" in FIG. 4, the quality of waveform with more than 0.192 as a standard in mobile communication is can be satisfied.

In about 65-70 dB of isolation in case of the [Practical Example], also when isolation margin is to be 8 dB (namely, isolation: 65 dB, gain: 55 dB) in 0.7 μs of system delay in Repeater as "Experimental Example 3" in FIG. 4, service can be performed without Oscillation because the quality of output waveform with more than 0.192 as a standard in mobile communication is satisfied.

Figure 7:
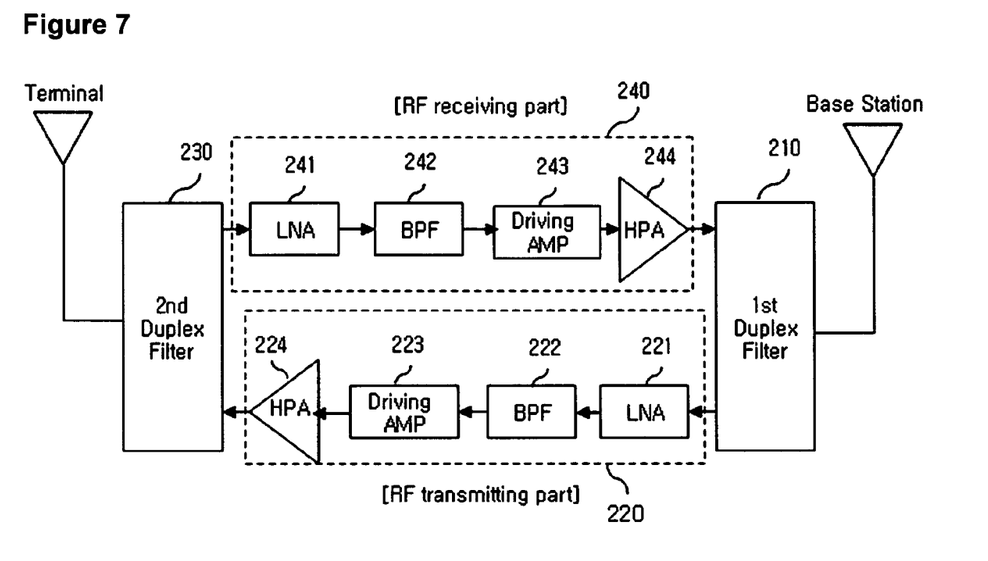
FIG. 7 is a function block diagram which indicated internal configuration of Small-sized Integrated RF Type Repeater.

FIG. 7 is as a Function Block Diagram of Junction circuit part (200) in Small-sized Integrated RF Type Repeater in accordance with a Practical Example of the present invention, the Emitting Element which formed in the first Service (transmitting) Antenna (110) and the first Donor (receiving) Antenna (310) as illustrated in FIG. 5 is connected to the Junction circuit part (200) and Feeder (113, 313) of internal Shield Box (400) electrically.

In this case, the Junction circuit part is comprised of the first Duplex Filter (210), RF transmitting part (220), the second Duplex Filter (230) and RF receiving part (240) as illustrated in FIG. 7.

The first Duplex Filter (210) plays the role to separate RF signal which received from the Base Station into the RF transmitting part (220), or to transmit RF signal which received from the receiving part (240) to the Base Station via the Antenna.

Also, when the RF transmitting part (220) is received RF signal from the first Duplex Filter (210), it plays the role to output to the second Duplex Filter (210) by performing High Power amplification after Filtering RF signal.

In this case, the RF transmitting part (220) is comprised of the first LNA (Low Noise Amplifier) (221) which amplifies it with minimization of noise when it received RF signal from the first Duplex Filter (210); and the first BPF (Band Pass Filter) (222) which outputs it after performing the Filtering function with reception of RF signal from the LNA (221); and the first Driving Amplifier (223) which output it after performing the amplification with reception of RF signal which is performed the Filtering via the first BPF (222); and the first HPA (High Power Amplifier) (224) which outputs it to the second Duplex Filter (230) after performing High Power amplification of RF signal which amplified via the first Driving Amplifier (223). Inhere, the first BPF (222) is embodied with DR (Dielectronic Resonator) Filter which has less than about 0.7 μs of delay, but whatever Filter which has low delay is applicable.

On the other hand, the second Duplex Filter outputs RF signal to be separated transmitting/receiving RF signal path, but it receives RF signal from the RF transmitting part (220) and transmit it to the Terminal, and also plays the role to transmit it to the RF receiving part (240) when RF signal from the Terminal is received.

Also, when the RF receiving part (240) receives RF signal which transmitted from the Terminal via the second Duplex Filter (230), it plays the role to output it to the first Duplex Filter (210) with performing High Power amplification after Filtering of RF signal.

In this case, the RF receiving part (240) is comprised of the second LNA (241) amplifies it with minimization of noise when it received RF signal from the first Duplex Filter (210); and the first BPF (Band Pass Filter) (222) which outputs it after performing Filtering function with reception of RF signal from the LNA (221); and the first Driving Amplifier (223) which outputs it after performing amplification with reception of RF signal which is performed Filtering via the second BPF (242); and the second HPA (244) which output it to the first Duplex Filter (210) after performing High Power amplification of RF signal which amplified via the second Driving Amplifier (243). In here, the second BPF (242) is embodied with DR (Dielectronic Resonator) Filter which have less than about 0.7 µs of delay, but whatever Filter which has low delay is applicable.

Then, the operation process of Small-sized Integrated RF Type Repeater in accordance with a Practical Example of the present invention with configuration as is described referring to FIG. 7.

First, in explanation of transmitting process from the Base Station to the Terminal, the first Duplex Filter (210) outputs it to the first LNA (220) of the RF transmitting part with reception of RF signal from the Base Station.

Then, the first LNA (221) receives RF signal from the first Duplex Filter (210), and then outputs it to the first BPF (222) with amplification after performing minimization of noise.

On the other hand, the first BPA (222) receives RF signal from the first LNA (221), and then outputs it to the first Driving Amplifier (223) after performing Filtering function.

Then, the first Driving Amplifier (223) receives RF signal which performed Filtering via the first BPF (222), and then outputs it to the first HPA (224) with amplification.

Also, the first HPA (224) outputs it to the second Duplex Filter (230) after performing High Power Amplification of RF signal which amplified via the first Driving Amplifier (223).

Then, the second Duplex Filter (230) receives RF signal from the first HPA (224) of RF transmitting part, and then transmit it to the Terminal.

On the other hand, receiving process from the Terminal to the Base Station is described in below.

First, the second Duplex Filter (230) receives RF signal from the Terminal, and then outputs it to the second LNA (241) of the RF receiving part (240).

Then, the second LNA (241) receives RF signal from the second Duplex Filter (230), and then outputs it to the second BPF (242) with amplification after performing minimization of noise.

On the other hand, the BPF (240) receives RF signal from the second LNA (241), and then outputs it to the second Driving Amplifier (243) after performing Filtering function.

Then, the second Driving Amplifier (243) receives RF signal which performed Filtering via the second BPF (242), and then outputs it to the second HPA (244) with amplification.

Also, the second HPA (244) outputs RF signal which amplified via the second Driving Amplifier (243) to the first Duplex Filter (210) after performing High Power Amplification.

Then, the first Duplex Filter (210) receives RF signal from the second HPA (244) of the RF receiving part (240), and then transmit it to the Base Station.

As stated, in embodiment of Small-sized Integrated Repeater in accordance with the present invention, it makes good output waveform to transmit even in a state of low isolation margin to be realized minimization of Oscillation volume due to delay reduction of Repeater by application of RF type which possible to use of Filter with low delay, not IF type which used SAW Filter or Digital Filter with a relatively high delay, and it takes effect to expand so much service scope by improvement of output gain with this.

Also, according to the present invention, it has excellent effect on convenience for installation and maintenance because the Service (transmitting) Antenna, the Donor (receiving) Antenna and the Shield Box are installed inside the Cover, and also has improved output gain and good radiation pattern, and miniaturization is possible.

The present invention is described in more details giving several Practical Examples in-mentioned, but the present invention is not always limited to such Practical Examples and it can be carried out with transformation variously within the scope of unswerving technical mind of the invention.

What is claimed is:

1. Small-sized Integrated RF Type Repeater comprising:
a first and second Service (transmitting) Antenna which plays the role of signal transmission;
a junction circuit part which plays the role of relay;
a first and second Donor (receiving) Antenna which plays the role of signal reception; and
a Shield Box which protects and also plays the role of earth of the Junction circuit part,
wherein the first and second Service (transmitting) Antenna, the junction circuit part, the first and second Donor (receiving) Antenna and the Shield Box are installed inside of the same body (Cover),
and wherein the first Service (transmitting) Antenna and the first Donor (receiving) Antenna are formed to be attached to the opposite side of the Shield Box respectively, and the second Service Antenna is installed to be separated from the first Service (transmitting) Antenna between the inside of the Cover and the first Service (transmitting) Antenna, and the second Donor (receiving) Antenna is that installed to be separated from the first Donor (receiving) Antenna between the inside of the Cover and the first Donor (receiving) Antenna,
and wherein the Junction circuit part comprises a first Duplex Filter which makes RF signal path separate; an RF transmitting part which makes output with performing of high power amplification after Filtering when RF signal which transmitted from Base Station is received via the first Duplex Filter; a second Duplex Filter which makes output to separate transmitting/receiving RF signal path, and transmits RF signal received from the RF transmitting part to the Terminal, and also transmit RF signal to the receiving part when RF signal is received from the Terminal; and a RF receiving part which makes output to the first Duplex Filter with performing of high power amplification after Filtering when RF signal which transmitted from Base Station is received via the second Duplex Filter,
and wherein the transmitting part comprises a first LNA which amplifies RF signal with minimization of noise when RF signal is received from the first Duplex Filter; a first BPF which outputs after performing the Filtering function when RF signal is received from the LNA; a first Driving Amplifier which outputs after performing amplification of RF signal which is filtered via the first BPF; and a first HPA which outputs to the second Duplex Filter after performing High Power amplification of RF signal which is amplified via the first Driving Amplifier,
and wherein the first BPF is embodied with DR (Dielectronic Resonator) Filter which has less than 0.7 µs of delay.

2. The Small-sized Integrated Repeater as recited in claim 1, wherein the RF receiving part comprises:
a second LNA amplifies RF signal with minimization of noise when it received RF signal from the first Duplex Filter;
a first BPF which outputs after performing Filtering function when RF signal is received from the LNA;

a first Driving Amplifier which outputs after performing amplification of RF signal which is filtered via the second BPF; and a second HPA which outputs to the first Duplex Filter after performing High Power amplification of RF signal which is amplified via the second Driving Amplifier.

3. The Small-sized Integrated Repeater as recited in claim 2, wherein the second BPF is embodied with DR (Dielectronic Resonator) Filter which has less than about 0.7 μs of delay.

4. The Small-sized Integrated Repeater as recited in claim 1, wherein the first Service (transmitting) Antenna comprises:
a Board; and
an Emitting Element and a Feeder which are formed on one side of the Board and are connected to and the Junction circuit part electrically.

5. The Small-sized Integrated Repeater as recited in claim 4, wherein the Emitting Element has patch shape and is formed on the Board with the Etching Method.

6. The Small-sized Integrated Repeater as recited in claim 1, wherein The first Donor (receiving) Antenna comprises:
a Board; and
an Emitting Element and a Feeder which are formed on one side of the Board and are connected to and the Junction circuit part electrically.

7. The Small-sized Integrated Repeater as recited in claim 6, wherein the Parasitic Element has patch shape and is formed on the Board with the Etching Method.

8. The Small-sized Integrated Repeater as recited in claim 1, wherein the second Service Antenna comprises:
a Board; and
a Parasitic Element installed on one side of the Board.

9. The Small-sized Integrated Repeater as recited in claim 8, wherein the Parasitic Element has patch shape and is formed on the Board with the Etching Method.

10. The Small-sized Integrated Repeater as recited in claim 1, wherein the second Donor (receiving) Antenna comprises:
a Board; and
a Parasitic Element which installed in the one side of the Board.

11. The Small-sized Integrated Repeater as recited in claim 10, wherein the Parasitic Element has patch shape and is formed on the Board with the Etching Method.

12. The Small-sized Integrated Repeater as recited in claim 1, wherein the Cover is formed with the acryl material which is similar in permittivity to air.

13. The Small-sized Integrated Repeater as recited in claim 1, wherein the Donor Antenna and Service Antenna use different polarization.

14. Small-sized Integrated Repeater comprising Service (transmitting) Antenna and Donor (receiving) Antenna in the same body, the Repeater comprising:

a first Duplex Filter which makes transmitting/receiving RF signal path separate;

an RF transmitting part which makes output by filtering RF signal received via the first Duplex Filter which is transmitted from Base Station and then performing of high power amplification;

a second Duplex Filter which makes output to separate transmitting/receiving RF signal path, transmits RF signal to the Terminal which is received from the RF transmitting part, and also transmits RF signal to the receiving part when RF signal is received from the Terminal; and an RF receiving part which makes output to the first Duplex Filter by filtering RF signal received via the second Duplex Filter which is transmitted from Base Station and then performing of high power amplification, wherein the transmitting part comprises: a first LNA which amplifies RF signal with minimization of noise when RF signal is received from the first Duplex Filter; a first BPF which outputs RF signal after performing the filtering function when RF signal is received from the LNA; a first Driving Amplifier which outputs RF signal by performing amplification of RF signal which is filtered via the first BPF; and a first HPA which outputs RF signal to the second Duplex Filter after performing High Power amplification of RF signal which is amplified via the first Driving Amplifier, and wherein the first BPF is embodied with DR (Dielectronic Resonator) Filter which has less than about 0.7 μs of delay.

15. The Small-sized Integrated Repeater as recited in claim 14, wherein the RF receiving part comprises:
a second LNA amplifies RF signal with minimization of noise when it received RF signal from the first Duplex Filter;
a first BPF which outputs RF signal after performing filtering function when RF signal is received from the LNA;
a first Driving Amplifier which outputs RF signal by performing amplification when RF signal filtered via the second BPF is received; and
a second HPA which outputs RF signal to the first Duplex Filter after performing High Power amplification of RF signal which amplified via the second Driving Amplifier.

16. The Small-sized Integrated Repeater as recited in claim 15, wherein the second BPF is embodied with DR (Dielectronic Resonator) Filter which has less than about 0.7 μs of delay.

* * * * *